F. J. NIEMOLLER.
Fire Shovel.

No. 42,867. Patented May 24, 1864.

UNITED STATES PATENT OFFICE.

F. J. NIEMÖLLER, OF RICH FOUNTAIN, MISSOURI.

IMPROVEMENT IN FIRE-SHOVELS.

Specification forming part of Letters Patent No. 42,867, dated May 21, 1864.

*To all whom it may concern:*

Be it known that I, F. J. NIEMÖLLER, of Rich Fountain, in the county of Osage and State of Missouri, have invented a new and Improved Combined Shovel, Bellows, and Hook; and I do hereby declare that the following is a full, clear, and exact description of the same, reference being had to the accompanying drawings, forming a part of this specification, in which—

Figure 1:
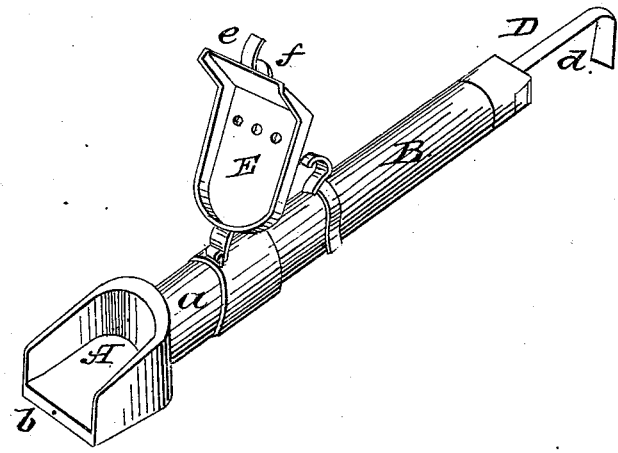
Figure 2:
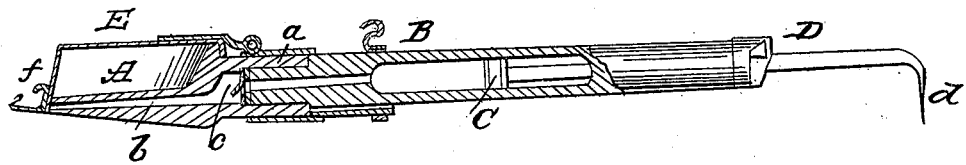

Figure 1 represents a perspective view of my invention. Fig. 2 is a longitudinal central section of the same.

Similar letters of reference in both views indicate corresponding parts.

This invention consists in a shovel with a hollow bottom and handle, in combination with a plunger or piston working in said hollow handle in such a manner that the shovel will serve the double purpose of shovel and bellows; also, in the application of a hook to the front end of the cover of the shovel for the purpose of removing the covers from a stove; finally, in providing the stem or rod of the piston with a hook at its upper end, so that the same can be used as a poker.

To enable those skilled in the art to fully understand and construct my invention, I will proceed to describe it.

A represents a shovel made of cast-iron or other suitable material and secured by means of a socket, *a*, to the handle B. The socket *a* terminates in a channel, *b*, which extends throughout the entire length of the bottom of the shovel, and terminates at the front edge of the same, and the handle B is made hollow and provided with a plunger, C, as shown clearly in Fig. 2 of the drawings. A valve, *c*, at the bottom end of the handle B prevents the entrance of dirt and dust when the plunger is drawn up, and by forcing the plunger down the air contained in the barrel is forced out through the channel *b*, and by these means a fire in the stove or furnace can be readily brought to a blaze. The plunger C is operated by a rod, D, which extends beyond the handle B and terminates in a hook, *d*. By drawing out the rod D the hook *d* can be conveniently used as a poker. The shovel A is provided with a cover, E, which is hinged to its rear end or socket, so that it can be turned back to the position shown in Fig. 1, when it is desired to use the same for introducing coal in a stove or furnace, or as a bellows for starting the fire, or said cover may be turned down to the position shown in Fig. 2, when it closes the shovel. The front edge of the cover terminates in a lip, *e*, and hook *f*, which are intended as lifters to handle and move the covers of a stove or range.

The whole implement is very compact, and it combines shovel, bellows, poker, and lifter.

What I claim as new, and desire to secure by Letters Patent, is—

1. The shovel A, provided with a channel, *b*, in its bottom, in combination with the hollow handle B and plunger C, constructed and operating in the manner and for the purpose substantially as herein shown and described.

2. The application of the lifter *e f* to the front edge of the cover E of the shovel, substantially as and for the purpose specified.

3. The application of the hook or poker *d* to the piston-rod D, as and for the purpose set forth.

F. J. NIEMÖLLER.

Witnesses:
  WM. DAVIDSON,
  L. ROCHLIEN.